(12) United States Patent
Marquez

(10) Patent No.: US 10,570,634 B1
(45) Date of Patent: Feb. 25, 2020

(54) PORTABLE BATHROOM ASSEMBLY

(71) Applicant: Alfonso Marquez, Westmorelands, CA (US)

(72) Inventor: Alfonso Marquez, Westmorelands, CA (US)

( * ) Notice: Subject to any disclaimer, the term of this patent is extended or adjusted under 35 U.S.C. 154(b) by 0 days.

(21) Appl. No.: 16/128,080

(22) Filed: Sep. 11, 2018

(51) Int. Cl.
*E04H 1/12* (2006.01)
*A47K 17/02* (2006.01)
*A47K 11/02* (2006.01)

(52) U.S. Cl.
CPC .......... *E04H 1/1216* (2013.01); *A47K 11/02* (2013.01); *A47K 17/022* (2013.01); *A47K 17/026* (2013.01)

(58) Field of Classification Search
CPC ....... E04H 1/1216; A47K 11/02; A47K 11/04; A47K 2017/006
USPC ..................................................... 4/478, 476
See application file for complete search history.

(56) References Cited

U.S. PATENT DOCUMENTS

| | | | |
|---|---|---|---|
| 3,447,167 A * | 6/1969 | Harding | A47K 11/035 4/462 |
| 4,334,330 A | 1/1982 | Marshall | |
| 4,587,678 A | 5/1986 | Love | |
| 4,894,871 A | 1/1990 | Schmerler | |
| 5,007,618 A | 4/1991 | Libby | |
| 6,286,154 B1 | 9/2001 | Pitts | |
| 6,681,413 B2 * | 1/2004 | Weiss | A47K 11/02 4/476 |
| 9,518,398 B2 * | 12/2016 | Taylor | E04H 1/1216 |
| 9,662,252 B1 | 5/2017 | Pearson | |
| 2007/0245477 A1 * | 10/2007 | Land | A47K 11/02 4/476 |
| 2018/0255985 A1 * | 9/2018 | Critz | A47K 11/02 |

* cited by examiner

*Primary Examiner* — Janie M Loeppke

(57) ABSTRACT

A portable bathroom assembly for facilitating a disabled user to use a toilet without assistance includes a surround that has a floor, a wall and an entrance extending through the wall for entering the surround. A urinal is coupled to the surround for receiving urine from a male user. The urinal is positioned on the second lateral side of the panel adjacent to the entrance. A portable toilet is positioned on the floor and the portable toilet is mounted for urination and defecation. The portable toilet is slidably coupled to the surround and the portable toilet is slidable between a maximum distance and a minimum distance from the entrance.

3 Claims, 5 Drawing Sheets

PORTABLE BATHROOM ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to bathroom devices and more particularly pertains to a new bathroom device for facilitating a disabled user to use a toilet without assistance.

BRIEF SUMMARY OF THE INVENTION

An embodiment of the disclosure meets the needs presented above by generally comprising a surround that has a floor, a wall and an entrance extending through the wall for entering the surround. A urinal is coupled to the surround for receiving urine from a male user. The urinal is positioned on the second lateral side of the panel adjacent to the entrance. A portable toilet is positioned on the floor and the portable toilet is mounted for urination and defecation. The portable toilet is slidably coupled to the surround and the portable toilet is slidable between a maximum distance and a minimum distance from the entrance.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
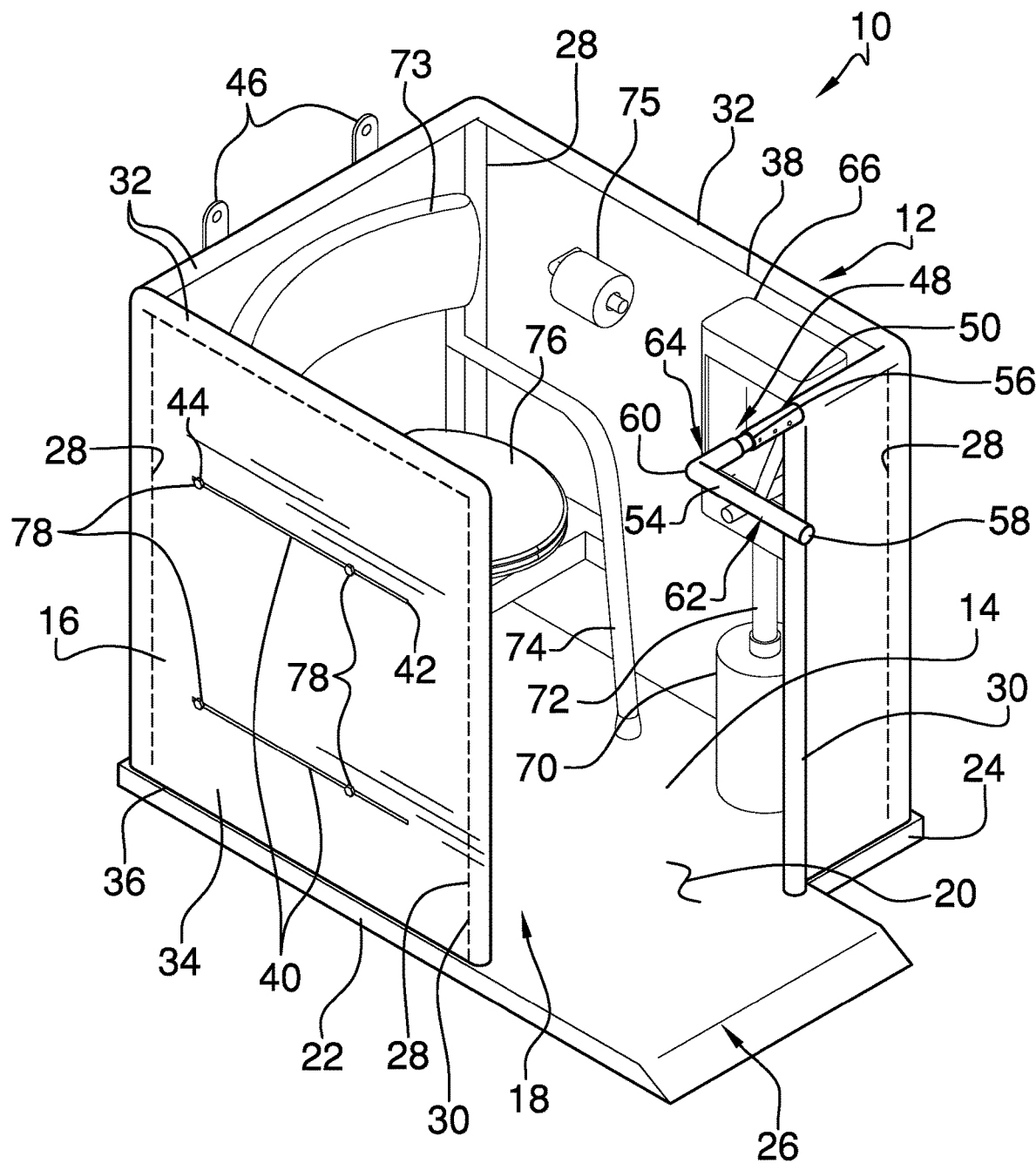
FIG. 1 is a top perspective view of a portable bathroom assembly according to an embodiment of the disclosure.
Figure 2:
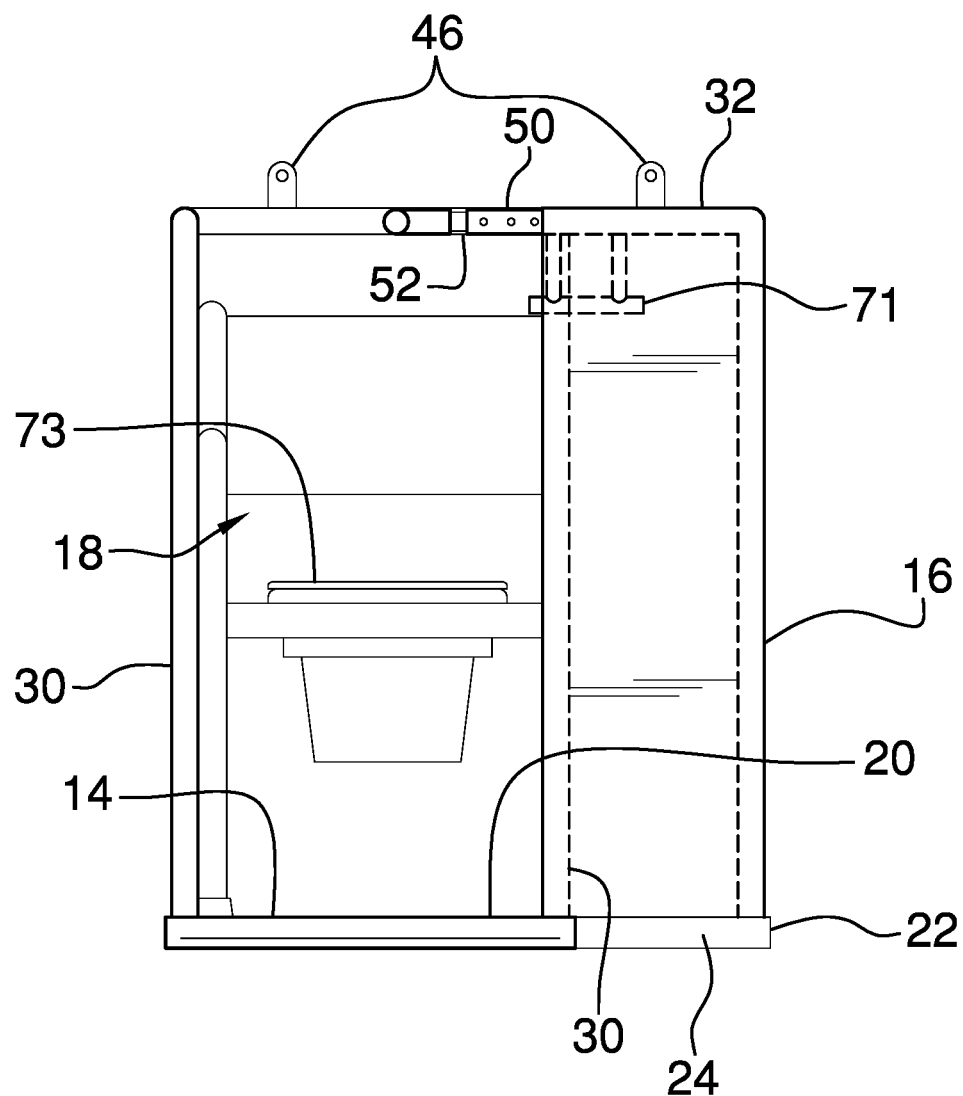
FIG. 2 is a front phantom view of an embodiment of the disclosure.
Figure 3:
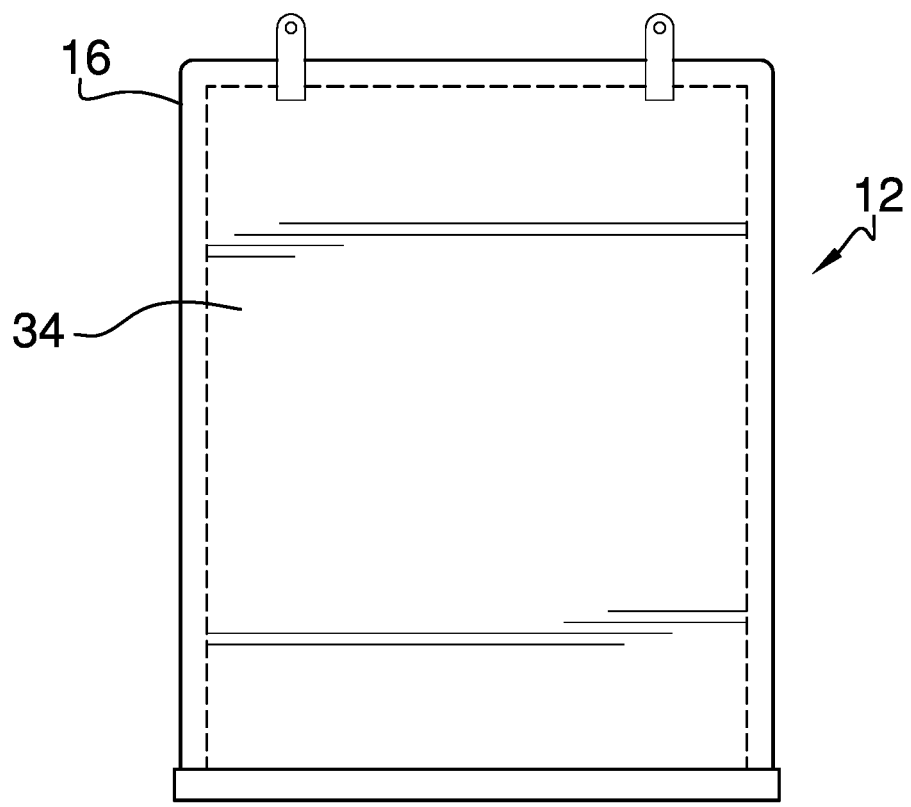
FIG. 3 is a back phantom view of an embodiment of the disclosure.
Figure 4:
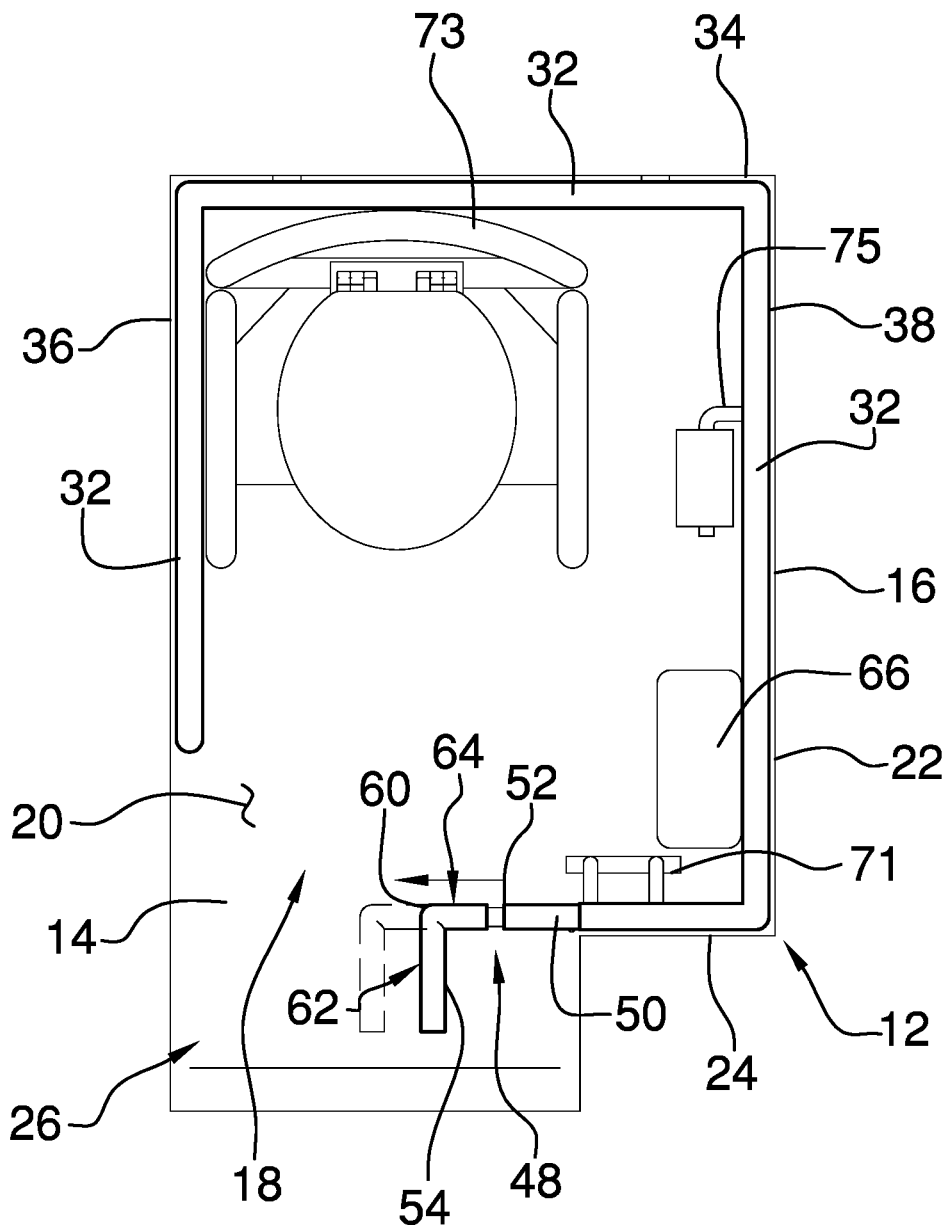
FIG. 4 is a top view of an embodiment of the disclosure.
Figure 5:
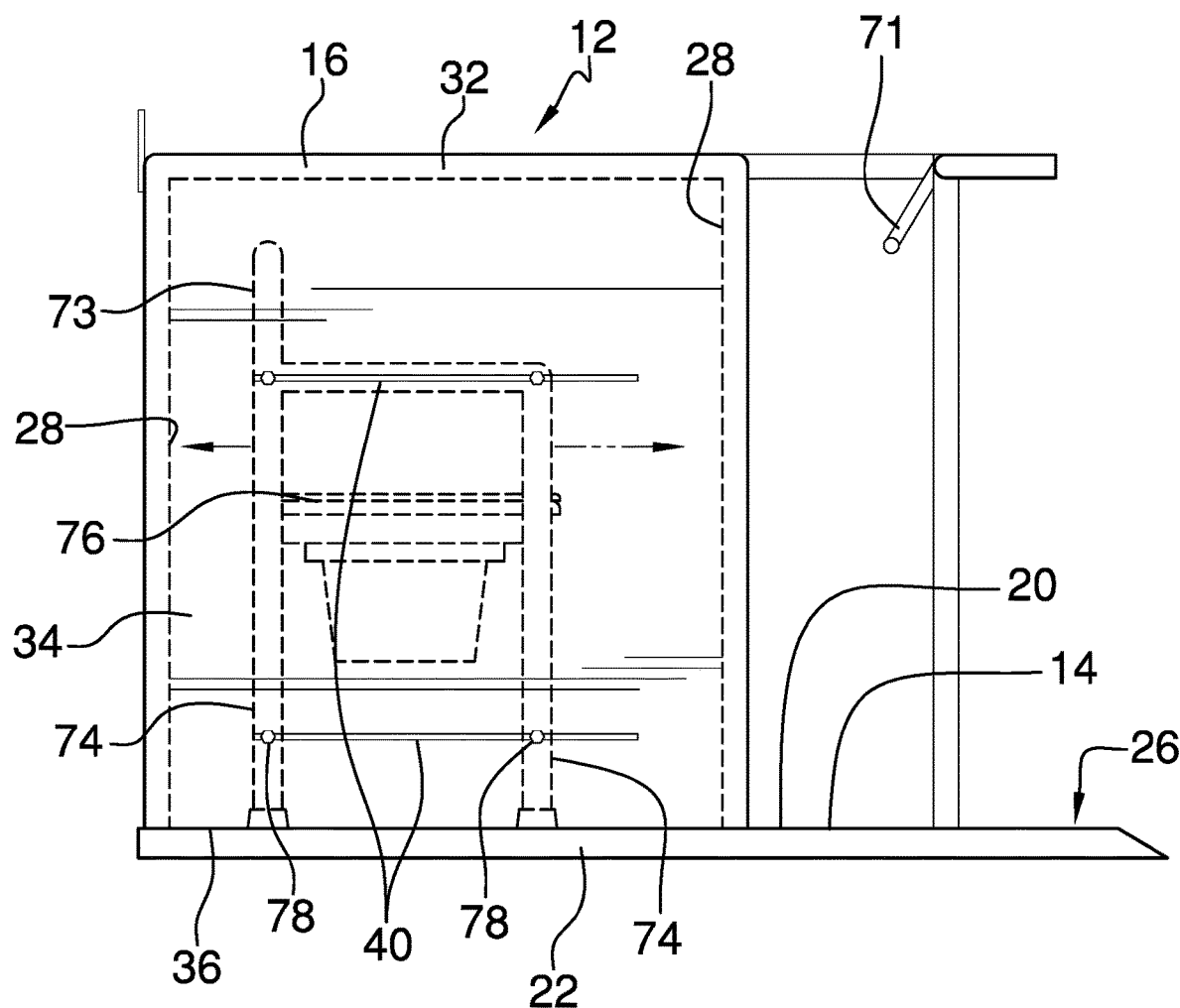
FIG. 5 is a right side phantom view of an embodiment of the disclosure.

With reference now to the drawings, and in particular to FIGS. 1 through 5 thereof, a new bathroom device embodying the principles and concepts of an embodiment of the disclosure and generally designated by the reference numeral 10 will be described.

As best illustrated in FIGS. 1 through 5, the portable bathroom assembly 10 generally comprises a surround 12 that has a floor 14, a wall 16 and an entrance 18 extending through the wall 16 for entering the surround 12. The floor 14 has a top surface 20 and a perimeter edge 22, and the perimeter edge 22 has a front side 24. Additionally, the floor 14 has a ramp section 26 extending outwardly beyond the front side 24. Thus, a person in a wheelchair can enter the surround 12 on the ramp section 26.

The wall 16 comprises a plurality of vertical members 28 that is each coupled to and extends upwardly from the top surface 20 of the floor 14. Each of the vertical members 28 is aligned with the perimeter edge 22 of the floor 14 and the vertical members 28 are spaced apart from each other and are distributed around the perimeter edge 22. The plurality of vertical members 28 includes a pair of entry members 30 and each of the entry members 30 is positioned on opposite sides of the ramp section 26 of the floor 14.

A plurality of horizontal members 32 is each coupled between a respective pair of the vertical members 28. Each of the horizontal members 32 is spaced from the top surface 20 of the floor 14 and each of the horizontal members 32 is horizontally oriented. A panel 34 is coupled to and extends around the plurality of vertical members 28 such that panel 34 is substantially coextensive with the perimeter edge 22 of the floor 14. The panel 34 terminates at each of the entry members 30 to define the entrance 18 in the wall 16. The panel 34 has a first lateral side 36 and a second lateral side 38, and the first lateral side 36 has a pair of slots 40 extending therethrough. Each of the slots 40 is horizontally oriented and the slots 40 are spaced apart from each other and are coextensive with each other. Additionally, each of the slots 40 has a front terminal end 42 and a back terminal end 44.

A pair of tabs 46 is each of the tabs 46 is coupled to and extends upwardly from a respective one of the horizontal members 32. Each of the tabs 46 is fastened to a support surface, such as a wall or the like, for restraining the surround 12. A handle 48 is slidably coupled to a respective one of the entry members 30 for gripping and the handle 48 is aligned with a respective one of the horizontal members 32.

The handle 48 comprises a sleeve 50 that is coupled to and extends away from the respective entry member 30 and the sleeve 50 has a distal end 52 with respect to the respective entry member 30. A rod 54 is provided that has a first end 56 and a second end 58. The rod 54 has a bend 60 thereon to define a first portion 62 of the rod 54 forming an angle with a second portion 64 of the rod 54. The distal end 52 of the sleeve 50 insertably receives the second portion 64 of the rod 54 having the first portion 62 of the rod 54 being spaced upwardly from the ramp portion of the floor 14 and being horizontally oriented. Thus, the first portion 62 is gripped by a user for entering the surround 12. The user may be a physically disabled user that is confined to a wheelchair or an individual that struggles to use a bathroom without assistance.

A urinal 66 is coupled to the surround 12 for receiving urine from a male user. The urinal 66 is positioned on an inside surface 68 of the panel 34 and the urinal 66 is positioned on the second lateral side 38 of the panel 34 adjacent to the entrance 18. A container 70 is positioned on the floor 14 and a conduit 72 is fluidly coupled between the urinal 66 and the container 70. Thus, the container 70 receives the urine from the urinal 66 for storage. The container 70 is removable from the surround 12 for emptying or cleaning the container 70. A grip 71 is coupled to the inside surface 68 of the panel 34 and the grip 71 is positioned adjacent to the urinal 66. This, the grip 71 can be gripped by the male when the male urinates in the urinal 66.

A portable toilet 73 is positioned on the floor 14 such that the portable toilet 73 may be mounted for urination and defecation. The portable toilet 73 is slidably coupled to the surround 12. Moreover, the portable toilet 73 is slidable between a maximum distance and a minimum distance from the entrance 18. The portable toilet 73 is slid the maximum distance from the entrance 18 to accommodate the male user to stand on the floor 14 while the male user urinates in the urinal 66. Additionally, the portable toilet 73 is slid the minimum distance from the entrance 18 to make mounting the portable toilet 73 as easy as possible. A toilet paper roller 75 is coupled to the inside surface 68 of the panel 34 and the toilet paper roller 75 is positioned adjacent to the portable toilet 73.

The portable toilet 73 includes a plurality of legs 74 and a seat 76. The seat 76 is sat upon for urination and defecation and a respective pair of legs 74 is positioned adjacent to the first lateral side 36 of the wall 16. A plurality of engagements 78 is each coupled to and extends laterally away from a respective one of the legs 74 that is positioned adjacent to the first lateral side 36 of the well. Each of the engagements 78 slidably engages a respective one of the slots 40 in the first lateral side 36 of the wall 16. Respective ones of the engagements 78 abuts the back terminal end 44 of the slots 40 when the portable toilet 73 is spaced the maximum distance from the entrance 18. Alternatively, respective ones of the engagements 78 abuts the front terminal end 42 of the slots 40 when the portable toilet 73 is spaced the minimum distance from the entrance 18.

In use, the surround 12 is positioned in a location that is readily accessible to a physical disabled user. The portable toilet 73 is slid the maximum distance from the entry when a male needs to urinate in the urinal 66 thereby creating as much room as possible for the male to stand on the floor 14. The handle 48 can be gripped by the male to steady themselves while they urinate in the urinal 66. The portable toilet 73 is slid the minimum distance from the entry when the portable toilet 73 is going to be mounted for urination or defecation. In this way the portable toilet 73 is as close as possible to the entrance 18 to make it as easy as possible for the user to mount the portable toilet 73 without assistance. Each of the horizontal members 32 of the wall 16 can be gripped for assisting the user with sitting down on the portable toilet 73 and standing up from the portable toilet 73. In this way the user can urinate or defecate without assistance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable bathroom assembly being configured to facilitate both male and female disabled users, said assembly comprising:

a surround having a floor, a wall and an entrance extending through said wall for entering said surround, said floor having a top surface and a perimeter edge, said perimeter edge having a front side, said floor having a ramp section extending outwardly beyond said front side, said wall comprising a plurality of vertical members, each of said vertical members being coupled to and extending upwardly from said top surface of said floor, each of said vertical members being aligned with said perimeter edge of said floor, said vertical members being spaced apart from each other and being distributed around said perimeter edge, said plurality of vertical members including a pair of entry members, each of said entry members being positioned on opposite sides of said ramp section of said floor, a plurality of horizontal members, each of said horizontal members being coupled between a respective pair of said vertical members, each of said horizontal members being spaced from said top surface of said floor and being horizontally oriented, a panel being coupled to and extending around said plurality of vertical members such that said panel is substantially coextensive with said perimeter edge of said floor, said panel terminating at each of said entry members to define said entrance in said wall, said panel having a first lateral side and a second lateral side, wherein said first lateral side has a pair of slots extending therethrough, each of said slots being horizontally oriented, said slots being spaced apart from each other and being coextensive with each other, said slots having a front terminal end and a back terminal end, and a handle being slidably coupled to a respective one of said entry members, said handle being aligned with a respective one of said horizontal members, wherein said handle comprises a sleeve being coupled to and extending away from said respective entry member, said sleeve having a distal end with respect to said respective entry member, and a rod having a first end and a second end, said rod having a bend thereon to define a first portion of said rod forming an angle with a second portion of said rod, said distal end of said sleeve insertably receiving said second portion of said rod having said first portion of said rod being spaced upwardly from said ramp portion of said floor and being horizontally oriented wherein said first portion is configured to be gripped;

a urinal being coupled to said surround wherein said urinal is configured to receive urine from a male user, said urinal being positioned on an inside surface of said panel, said urinal being positioned on said second lateral side of said panel adjacent to said entrance; and a portable toilet being positioned on said floor wherein said portable toilet is configured to be mounted for urination and defecation, said portable toilet being slidably coupled to said surround, said portable toilet being slidable between a maximum distance and a minimum distance from said entrance.

2. The assembly according to claim 1, further comprising:

said portable toilet including a plurality of legs, a respective pair of legs being positioned adjacent to said first lateral side of said wall; and a plurality of engagements, each of said engagements being coupled to and extending laterally away from a respective one of said legs being positioned adjacent to said first lateral side of said wall, each of said engagements slidably engaging a respective one of said slots in said first lateral side of said wall, respective ones of said engagements abutting said back terminal end of said slots when said portable toilet is spaced said maximum distance from said entrance, respective ones of said engagements abutting said front terminal end of said slots when said portable toilet is space said minimum distance from said entrance.

3. A portable bathroom assembly being configured to facilitate both male and female disabled users, said assembly comprising:

a surround having a floor, a wall and an entrance extending through said wall for entering said surround, said floor having a top surface and a perimeter edge, said perimeter edge having a front side, said floor having a ramp section extending outwardly beyond said front side, said wall comprising:

a plurality of vertical members, each of said vertical members being coupled to and extending upwardly from said top surface of said floor, each of said vertical members being aligned with said perimeter edge of said floor, said vertical members being spaced apart from each other and being distributed around said perimeter edge, said plurality of vertical members including a pair of entry members, each of said entry members being positioned on opposite sides of said ramp section of said floor;

a plurality of horizontal members, each of said horizontal members being coupled between a respective pair of said vertical members, each of said horizontal members being spaced from said top surface of said floor and being horizontally oriented;

a panel being coupled to and extending around said plurality of vertical members such that said panel is substantially coextensive with said perimeter edge of said floor, said panel terminating at each of said entry members to define said entrance in said wall, said panel having a first lateral side and a second lateral side, said first lateral side having a pair of slots extending therethrough, each of said slots being horizontally oriented, said slots being spaced apart from each other and being coextensive with each other, said slots having a front terminal end and a back terminal end;

a pair of tabs, each of said tabs being coupled to and extending upwardly from a respective one of said horizontal members, each of said tabs being fastened to a support surface for restraining said surround; and a handle being slidably coupled to a respective one of said entry members, said handle being aligned with a respective one of said horizontal members, said handle comprising:

a sleeve being coupled to and extending away from said respective entry member, said sleeve having a distal end with respect to said respective entry member; and a rod having a first end and a second end, said rod having a bend thereon to define a first portion of said rod forming an angle with a second portion of said rod, said distal end of said sleeve insertably receiving said second portion of said rod having said first portion of said rod being spaced upwardly from said ramp portion of said floor and being horizontally oriented wherein said first portion is configured to be gripped;

a urinal being coupled to said surround wherein said urinal is configured to receive urine from a male user, said urinal being positioned on an inside surface of said panel, said urinal being positioned on said second lateral side of said panel adjacent to said entrance;

a container being positioned on said floor;

a conduit being fluidly coupled between said urinal and said container wherein said container is configured to receive the urine from said urinal for storage;

a portable toilet being positioned on said floor wherein said portable toilet is configured to be mounted for urination and defecation, said portable toilet being slidably coupled to said surround, said portable toilet being slidable between a maximum distance and a minimum distance from said entrance, said portable toilet including a plurality of legs and a seat, said seat being sat upon for urination and defecation, a respective pair of legs being positioned adjacent to said first lateral side of said wall; and a plurality of engagements, each of said engagements being coupled to and extending laterally away from a respective one of said legs being positioned adjacent to said first lateral side of said wall, each of said engagements slidably engaging a respective one of said slots in said first lateral side of said wall, respective ones of said engagements abutting said back terminal end of said slots when said portable toilet is spaced said maximum distance from said entrance, respective ones of said engagements abutting said front terminal end of said slots when said portable toilet is space said minimum distance from said entrance.

* * * * *